Oct. 5, 1926.
G. G. TRIMBLE
1,602,133
SEALING APPARATUS FOR VENT HOLE CANS
Filed Sept. 21, 1925 2 Sheets-Sheet 1
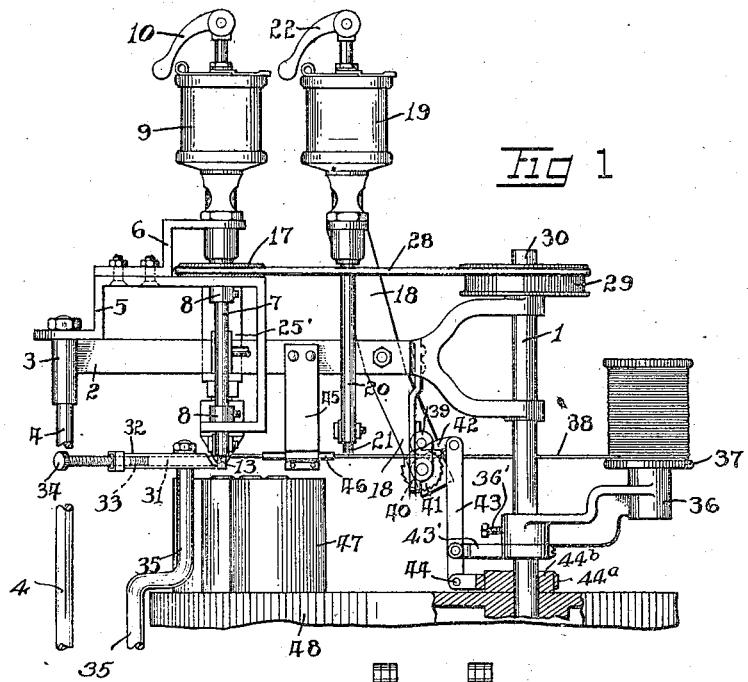
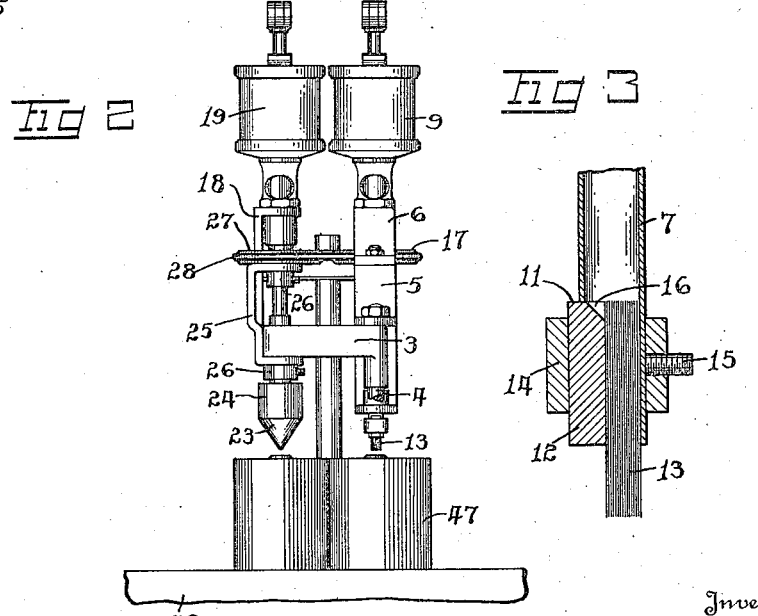
Inventor
GALE G TRIMBLE.
By Owen & Owen
Attorneys Oct. 5, 1926.
G. G. TRIMBLE
1,602,133
SEALING APPARATUS FOR VENT HOLE CANS
Filed Sept. 21, 1925  2 Sheets-Sheet 2
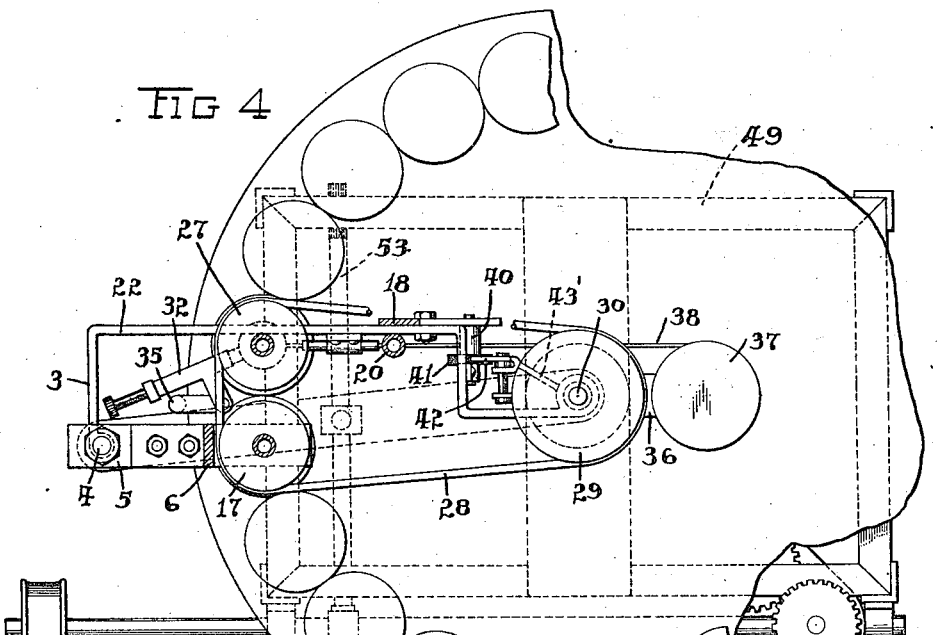
Inventor
GALE G TRIMBLE.
By Owen & Owen
Attorneys Patented Oct. 5, 1926.

1,602,133

UNITED STATES PATENT OFFICE.

GALE G. TRIMBLE, OF WAUSEON, OHIO.

SEALING APPARATUS FOR VENT-HOLE CANS.

Application filed September 21, 1925. Serial No. 57,803.

This invention relates to the sealing of cans but more particularly to the sealing of vent-hole cans customarily used to contain liquids.

Liquids, such as milk, are usually stored for shipment and for marketing in cans commonly called vent-hole cans, which are hermetically sealed at all points except a small vent hole punched out of one end. The liquid is ordinarily forced through these small holes under pressure and thereafter the holes are sealed by solder to prevent the ingress of bacteria laden air as well as preventing spilling of the contents.

One form of mechanism commonly used for sealing these vent holes comprises a pointed or conically shaped iron which is heated by gas and rotated rapidly and to which the solder wire is fed. The cans are conveyed underneath the soldering iron and when properly positioned the iron is lowered, at the same time engaging the solder wire to melt a small portion thereof, the melted solder flowing to the point of the iron so that when the point projects into the vent hole the solder forms a seal. In order to obtain proper sealing it is necessary to combine with the solder a small amount of flux to increase the adhesive qualities of the solder. A well known manner of combining the flux with the solder has been to construct the solder wire with a core of flux so that when a portion of the wire is melted the flux flows with the solder to the point of the iron and is thereby distributed around the vent hole in the sealing operation.

Empirically I have found that this manner of sealing cans is inefficient and inadequate and fails to accomplish the desired results because in many cases a drop of flux passes through the vent hole and into the liquid in the can, this drop being commonly termed a "button" in the trade, and is a distinct objection for obvious reasons. It has also been discovered that not infrequently the solder fails to cover the entire area of the vent hole, a portion of the flux constituting a part of the sealing; this being usually discovered in the sterilization process after sealing necessitating resealing or discarding of the can. A still further objection resides in the fact that solder wire having a flux core, such as above described, is exceedingly expensive and increases the sealing cost to a marked degree.

Objects of this invention are to overcome the above difficulties in a simple and convenient manner; to provide an apparatus for sealing the vent holes in cans which effectively operates to seal the hole without liability of flux or solder dropping into the contents of the can; to eliminate the use of the solder wire having a flux core thereby materially reducing the cost of sealing; and to provide an apparatus for sealing vent holes in cans having the new and improved features of construction, arrangement and operation hereinafter described.

In the illustrated embodiment of my invention I provide a rotating flux applying element and in advance thereof a rotating soldering element. These two elements may revolve horizontally in a vertical plane above the cans which are arranged on end with the vent holes thereof uppermost. In operation, the sealing element operates to seal a can and concomitantly therewith the flux applying element distributes flux in the region of the vent hole on a succeeding can. Solder wire of comparatively small diameter is guided to the rotating soldering element and a small quantity of flux is distributed over the wire to facilitate the sealing operation. By spreading a film of flux over the vent hole and over the solder wire, it will be apparent that sufficient flux is used to secure proper sealing without liability of the flux entering the contents of the can. In this manner ordinary solder wire may be utilized without sacrificing efficient and effective sealing.

An illustrated embodiment of the invention is shown in the accompanying drawings in which Fig. 1 is a side elevational view of one form of my apparatus with some of the operating parts broken away; Fig. 2 is a front elevational view of the apparatus shown in Fig. 1; Fig. 3 is a sectional view of one of the flux applying brushes; Fig. 4 is a top plan view of the apparatus; Fig. 5 is a side view of part of the actuating mechanism; Fig. 6 is a side elevation of the actuating mechanism; and Fig. 7 is a section on the line 7—7 of Fig. 6.

In the embodiment of the invention illustrated, a tubular supporting post 1 is revolved horizontally in a vertical plane and pivotally connected to the post 1 and extending at substantially right angles therefrom is a supporting arm 2 having an L shaped extension 3 to which a depending rod 4 may be connected, the lower end of this rod being mounted in a manner hereinafter described. Fastened to the extension 3 is a substantially U-shaped bracket 5, to which is secured an angle bracket 6. Rotatably supported on the brackets 5 and 6 is a tubular shaft 7 having adjustable collars 8 for preventing longitudinal displacement of the shaft. Mounted on the angle bracket 6 is a reservoir 9 for liquid flux, this reservoir being of any well known or preferred type having a regulating handle 10, and communicating with the tubular shaft 7 so that liquid flux may flow therethrough. The liquid flux used may be of any well known or preferred composition particularly adapted for enabling solder securely to adhere to metal.

Formed on the end portion of the tubular shaft is a slot 11 for receiving a wedge block 12 which is adapted to be clamped tightly against the bristles of a brush 13 which has a portion projecting beyond the end of the shaft 7. Embracing the shaft 7 and bearing against the block 12 is a U-shaped clamping member 14 having an adjusting screw 15. By manipulating the screw 15 the block 13 thereby securely holding the bristles in place and preventing excessive flow of flux through the shaft. It is desirable to feed flux through the brush 13 in small quantities and for this purpose the block 12 is provided with a groove or notch 16 so that a drop of flux entering the groove 16 slowly seeps through the brush 13. Secured to the upper portion of the tubular shaft 7 is a sheave 17 for enabling the shaft and brush 13 to be rotated.

Fixed to the supporting arm 2 and extending upwardly therefrom is a bracket 18 for supporting a reservoir 19 which may be a type similar to the reservoir 9. The reservoir 19 is connected to a depending hollow stem 20 which has a brush 21 at the lower end similar to the brush 13. The reservoir 19 is also adapted to receive liquid flux and is also provided with a regulating handle 22 for controlling the liquid flow to the brush 21 through the stem 20.

Spaced horizontally from the brush 13 is a rotating cone-shaped soldering iron or tipper 23, having a stem (not shown) which projects through a sleeve-like heater 24, which is heated by gas fed in any suitable manner through a supply pipe 25'. For supporting the soldering iron 23 a U-shaped bracket 25 is connected to the supporting arm 2 and to hold the soldering iron in proper position, adjustable collars 26 are mounted thereon and arranged to bear against the supporting bracket. The soldering iron 23 is rotated by a sheave 27 fixed to the upper end thereof and a flexible belt 28 surrounds the sheaves 17 and 27 and also a drive sheave 29 fixed to a drive shaft 30 extending through the tubular post 1.

It will thus be seen that rotation of the sheave 29 conjointly drives the sheaves 17 and 27.

The mechanism for actuating the above described apparatus consists of a rectangular frame 49 which serves as a support for the drive shaft 50. The drive shaft 50 is provided with a pulley wheel 51 and any suitable source of power, such as an electric motor, may be utilized for rotating this shaft. Secured to the shaft 50 is an eccentric 52 to which is connected a rod 53 having a splined end portion 54 engaging a ring 55 which is pivotally connected to the frame 49. Connected to the rod 53 intermediate the ends thereof is a block 56 which is connected to the central portion of a lever 57 and one end of the lever 57 is secured to the post 4 while the opposite end of the lever slidably engages the shaft 30.

It will be apparent that by means of the eccentric 52 and connections above described, the shaft 4 is moved horizontally in a vertical plane, thus imparting the desired movement to the soldering iron 23 and flux applying brush 13, it being understood that the supporting arm of the apparatus pivots and slides on the post 1 to permit freedom of movement. It is also to be understood that the mechanism for obtaining this movement herein shown and described is given by way of illustration and not of limitation because numerous other mechanical devices may be employed to advantage.

For rotating the shaft 30 which is connected conjointly to drive its sheaves 17, 27 and 29, a bevel gear 58 is fixed to the drive shaft 50 and meshes with a bevel gear 59 secured to one end of a shaft 60. Also connected to the shaft 60 is a gear 61 which transmits rotation to the shaft 30 through the train of gears 62, 63, 64 and 65, the shaft being driven at a slightly lower speed than the drive shaft 50. Secured to the opposite end of the shaft 60 is a gear meshing with an internal gear 67 on the rotating table 48 which conveys the cans 47 to the sealing apparatus.

For tinning or cleaning the rotating soldering iron 23 at each revolution of the apparatus a stick of salamac 31 is supported in a housing 32 and is held in its outer position by a coil-spring 33, the tension of which may be adjusted by an adjusting screw 34. The housing 32 is carried by a stationary post 35 which is mounted on the frame 49 and it will thus be seen that upon each revolution of the apparatus the soldering iron 23 will engage the salamac stick 31.

An outstanding characteristic of this invention resides in the fact that ordinary solder wire, preferably of small diameter, may be used, this wire being fed intermittently to the soldering iron 23 so that at each revolution of the apparatus the soldering iron previously tinned by its engagement with the salamac stick, melts a predetermined amount of the solder wire which runs to the point of the soldering iron.

For feeding solder wire or other sealing material to the tipper 23, a support 36 is adjustably connected to the post 1 by means of a set screw 36' and a spool 37 having a length of solder wire 38 thereon is mounted on the support 36. The wire 38 passes between feed rolls 39 and 40, a ratchet wheel 41 being fixed to the roll 40 and this wheel may be intermittently rotated by means of a dog 42 pivoted to an arm 43. The arm 43 is pivoted intermediate its ends to a bracket 43' which is secured to the post 1 and the end portion of the arm 43 is connected by a pin 44 to an eccentric strap 44$^a$ which engages an eccentric 44$^b$ formed on the rotatable table 48. In this manner rotation of the table 48 causes the wire 38 to be intermittently fed to the tipper or soldering iron 23.

For guiding the solder wire 38 a depending plate 45 is fixed to the supporting arm 2, and a tubular guide 46 is connected to the lower end portion of the plate 45. It will be observed that the wire 38 is engaged by the brush 21 thereby applying liquid flux to the surface thereof before it reaches the soldering iron 23.

Cans 47 of the vent hole type which have previously been filled with liquid may be supported on the rotating table 48. As indicated in Fig. 2 it will be observed that concomitantly with the sealing of an advanced can 47 the next succeeding can is brushed by the brush 13 to coat the edge of the vent hole with flux. In the sealing operation the advanced can has previously been coated with the liquid flux around the edge of the vent hole. The soldering iron 23 having been tinned by the salamac stick, engages the end portion of the solder wire 38 which is immediately melted and runs to the point of the soldering iron. Thereupon the soldering iron is lowered owing to motion imparted thereto and projects through the vent hole thereby thoroughly distributing the melted solder to seal the hole. The liquid flux on the can, together with the flux on the solder wire, cooperates in effecting a fluid-tight seal and enables the solder efficiently to adhere to the can. Thereafter in the next revolution of the apparatus, the table 48 is rotated sufficiently for the succeeding can which has been coated with flux by the brush 13 to be brought into operative position relatively to the rotating soldering iron 23. Whereupon the operation above described is repeated and a new can is coated with flux by the brush 13 and the previously coated can is concomitantly sealed.

While I have shown and described my invention as required by the statute it is to be understood that numerous changes in details of construction, arrangement and operation may be effected, without departing from the spirit of the invention, especially as defined in the appended claims. It is also to be understood that although I have described solder as the sealing material throughout the specification, other materials may be used to advantage within the purview of this invention.

What I claim is:

1. An apparatus for sealing vent-hole cans having a movable flux-applying device, a vent-hole sealing device in advance of said flux-applying device and having movement similar to that of said device, solder guiding means, and means for feeding flux to the solder in the guide.

2. An apparatus for sealing vent-hole cans having a can feeding device, a flux-applying device, for applying a film of flux over the vent-hole, a vent hole sealing device in advance of said flux applying device, said can feeding device being revoluble relatively to said flux-applying and sealing devices, means for guiding sealing material to said sealing device, and means for feeding additional flux to the sealing material to augment that applied around the vent-hole.

3. An apparatus for sealing vent-hole cans having a support, a rotating element carried by said support for applying flux to the vent-holes, a rotating sealing element also carried by said support in advance of said flux applying element for sealing the vent-holes in said cans, means for guiding sealing material to said sealing element, means for applying flux to the sealing material for augmenting the flux applied to the vent-hole, and means for moving said support in a vertical plane thereby to seal a single can concomitantly to the application of flux to a succeeding can.

4. An apparatus for sealing vent-hole cans having mechanism for conveying cans on their ends, means for applying flux to the vent-holes, sealing means in advance of said applying means, means for feeding sealing material to said sealing means, means for applying flux to said sealing means prior to fusion of said material, common support for said flux-applying means and sealing means, said conveying mechanism and support being revoluble relatively to each other, and means for moving said support in a single vertical plane parallel with the advancing cans whereby said sealing means functions to seal one can concomitantly with the application of flux by said applying means to a succeeding can.

5. An apparatus for sealing vent-hole cans having an element for applying flux to cans in the region of the vent-hole in a limited amount, a rotating sealing element in advance of said flux-applying element, means for guiding a solder wire to said sealing element, means independent of said flux-applying element for applying flux to said wire, means for conveying cans on their ends, means for concomitantly moving said sealing and flux-applying element in such a manner that a can is sealed and a succeeding can receives an application of flux by said first flux-applying element.

6. An apparatus for sealing vent-hole cans having a rotatable flux-applying element for applying flux to cans in the region of the vent-holes, a rotatable sealing element in advance of said applying element, means for concomitantly revolving said elements vertically in a horizontal plane, means for guiding solder wire to said sealing element, and means for applying a minute quantity of flux to the wire, said last means being independent of said applying element.

7. An apparatus for sealing vent-holes in cans having means including a rotatable member for sealing the vent-hole in a can, means associated with and having movement with said sealing means for distributing flux over a succeeding can in the region of the vent-hole, said distributing means being operable simultaneously with the operation of said sealing means, means for guiding sealing material to said rotatable sealing member, and a member for applying flux in small quantities to the sealing material prior to the fusion thereof by said sealing means.

8. An apparatus for sealing vent-hole cans, including means for applying a film of flux to the can, solder feeding means, means to fuse the solder, in combination with separate means to apply an added amount of flux to the solder prior to the fusion of said solder, said last means comprising a tubular stem through which flux is adapted to flow, said stem having a slot at one end thereof, bristles extending into the end of said stem, a clamping member in said opening, and clamping means surrounding said stem and bearing against said member for securely holding said bristles in place.

9. An apparatus for sealing vent-hole cans including means for applying a film of flux to the can, solder feeding means, means to fuse the solder, in combination with separate means to apply an added amount of flux to the solder prior to the fusion of the solder, each of said applying means comprising a tubular stem through which flux is adapted to flow, said stem having a longitudinal slot at one end thereof, bristles extending into said end, a clamping block in said slot, said clamping block having a shallow recess at the inner end thereof adjacent said bristles, and means for forcing said block tightly against the bristles for holding the latter securely in place.

In testimony whereof I have hereunto signed my name to this specification.

GALE G. TRIMBLE.